March 6, 1973  R. GERETH  3,719,166
COATING APPARATUS
Filed Dec. 10, 1970
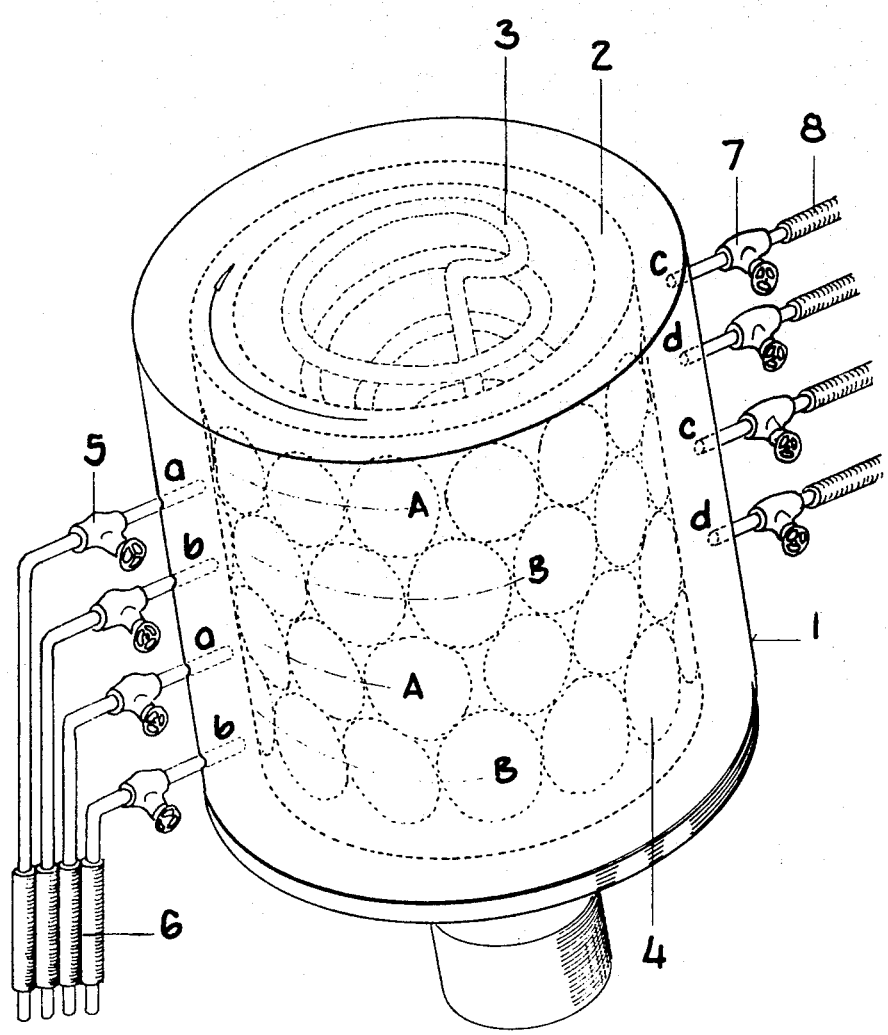
Inventor:
Reinhard Gereth
BY *Spencer & Kaye*
ATTORNEYS

United States Patent Office
3,719,166
Patented Mar. 6, 1973

3,719,166
COATING APPARATUS
Reinhard Gereth, Heilbronn, Germany, assignor to Licentia Patent-Verwaltungs G.m.b.H., Frankfurt am Main, Germany
Filed Dec. 10, 1970, Ser. No. 96,903
Claims priority, application Germany, Dec. 17, 1969, P 19 63 207.6
Int. Cl. C23g 13/08
U.S. Cl. 118—48
6 Claims

ABSTRACT OF THE DISCLOSURE

Vapor deposition apparatus includes a coating chamber having a plurality of vertically, aligned gas inlet means each one of which is diametrically opposed to an exhaust means. Each aligned inlet and exhaust means pair is aligned with a separate row of semi-conductor substrates supported on a vertically extending, rotatable susceptor.

BACKGROUND OF THE INVENTION

The invention relates to a device for the epitaxial deposition of semiconductor material on a substrate wherein the heating coil is mounted inside the reactor vessel. Such devices are also called epitaxy reactors.

SUMMARY OF THE INVENTION

The object of the invention is to provide a device for the epitaxial deposition of semiconductor material on a substrate in which both the gas supply and gas outlet are effected from the side through apertures provided in the side walls of the reactor vessel.

The lateral supply of gas or the lateral offtake of gas, provided according to the invention, permits a very uniform flow of gas, as a result of which uniform epitaxial layers are also obtained. The epitaxial layers deposited in one batch on the individual semiconductor wafers therefore have improved uniformity in comparison with the epitaxial layers which are produced in known reactors.

According to another object of the invention, the gas outlets are preferably disposed diametrically opposite the gas inlets.

According to a further object of the invention, mounted for rotation in the interior of the reactor vessel is a carrier member, the outer wall of which serves to receive the substrate wafers. The carrier member is preferably constructed in the form of a hollow cylinder in order that the heating coil present inside the reactor vessel may be disposed in the interior of this hollow cylinder. In this case, the reactor vessel itself is likewise cylindrical in construction.

For the better utilization of space, it is advisable to dispose the substrate semiconductor wafers present on the outer wall or cylindrical surface of the carrier member in an alternating sequence of rows. Associated with the individual rows of wafers there are then gas inlets and gas outlets which are at the same height as the semiconductor wafers in the row in question.

It is advisable to equip the gas inlets with distributor nozzles and to connect them to the gas supply through individual regulating valves. The connection to the gas supply is preferably effected through flexible intermediate members so that the gas supply pipes need not be disconnected from the reactor vessel when the reactor vessel is removed from the base plate to equip the wafer carrier with semiconductor wafers. There may be bevelled recesses for example in the wall of the carrier member to secure the semiconductor wafers to the outer wall of the carrier member. The gas outlets are also connected to the suction device through regulating valves.

BRIEF DESCRIPTION OF THE DRAWING

The invention will now be further described, by way of example, with reference to the accompanying drawing which illustrates one embodiment of an epitaxial reactor according to the invention.

DESCRIPTION OF PREFERRED EMBODIMENT

Referring to the drawing, the epitaxial reactor comprises a reactor vessel 1 and a semiconductor-wafer carrier a susceptor 2 mounted for rotation in the interior of the vessel 1. Both the reactor vessel 1 and the semiconductor-wafer carrier are in the form of a closed hollow cylinder. The two hollow cylinders are disposed concentrically in relation to one another. Inside the semiconductor-wafer carrier 2, which consists of graphite, is mounted a heating coil 3 necessary for heating the semiconductor wafers. As shown in the drawing, semiconductor wafers 4 to be coated epitaxially extend along alternating rows AB, AB . . . at the outer wall of the semiconductor-wafer carrier 2, in bevelled recesses which are not shown but which are let into the outer wall of the semiconductor-wafer carrier. The staggered arrangement of the rows A and B guarantees as satisfactory a utilization as possible of the surface of the semiconductor-wafer carrier 2, which is also called the "barrel." Since the semiconductor wafers to be coated epitaxially do not lie horizontally on a flat surface but are disposed vertically on the vertical wall of the wafer carrier, this is referred to as a vertical reactor in contrast to a horizontal reactor.

According to the invention, apertures a and b, through which reaction and carrier gases necessary for the epitaxial process enter, are provided in the side wall of the reactor vessel 1. These inlets a and b are at the same height as the rows A and B. The gas streams can be regulated individually through inlet valves 5 provided in the gas pipelines. The individual valves are connected to the main gas supply through flexible connections 6 in order to be able to extend the reactor vessel 1 upwards for filling.

Each inlet valve is provided with a spray-nozzle arrangement so as to obtain a uniform mixing of the reaction gases as well as a uniform coating of the semiconductor wafers. Precisely diametrically opposite the inlets a and b are gas outlets c and d which are likewise connected to a suction device through valves 7 and flexible connections 8. Like the intermediate members 6, the flexible intermediate members 8 serve to facilitate the filling of the epitaxial reactor with semiconductor wafers.

It will be understood that the above description of the present invention is susceptible to various modifications, changes and adaptations.

What is claimed is:
1. A device for the epitaxial deposition of semiconductor material on a substrate, comprising
   a reactor vessel;
   a heating coil mounted inside the reactor vessel;
   a rotatable, vertically disposed cylindrical susceptor located inside said reactor vessel for supporting on the outer surface, in vertical arrangement, horizontal rows of semiconductor substrates;
   gas supply means leading to the inside of the vessel through apertures in the outer wall of the vessel, one gas supply means being connected substantially in alignment with each said row; and
   gas outlet means disposed in the outer wall of said vessel through apertures in the outer wall of the vessel, one gas outlet means being connected substantially in alignment with each said row, said gas supply means being located substantially opposite said gas outlet means.

2. A device as claimed in claim 1, in which each gas inlet means is provided with a distributor nozzle.

3. A device as claimed in claim 1, in which each gas inlet means is connected to the gas supply through an individual regulating valve.

4. A device as claimed in claim 3, in which a flexible intermediate member is provided in the connection from the gas supply to each of said gas inlet means.

5. A device as claimed in claim 1, including a suction device, said outlet means being connected to the suction device through individual regulating valves.

6. A device as claimed in claim 5, in which a flexible intermediate member is provided in the connection from each of the gas outlet means to said suction device.

References Cited
UNITED STATES PATENTS

| | | | |
|---|---|---|---|
| 3,460,510 | 8/1969 | Currin | 118—48 |
| 3,198,167 | 8/1965 | Bakish et al. | 118—48 |
| 3,473,954 | 10/1969 | Mattson | 118—48 X |
| 2,847,319 | 8/1958 | Marvin | 118—48 X |
| 3,384,049 | 5/1968 | Capita | 118—49.5 |
| 3,424,629 | 1/1969 | Ernst | 118—48 X |

MORRIS KAPLAN, Primary Examiner